(12) United States Patent
Mane et al.

(10) Patent No.: US 7,754,239 B2
(45) Date of Patent: Jul. 13, 2010

(54) CAPSULE FOR RAPID SOLUBILIZATION AND RELEASE OF THE CONTENT

(75) Inventors: Jean Mane, Grasse (FR); Pierre Grimault, La Roquette sur Siagne (FR); Jean-Michel Hannetel, Grasse (FR)

(73) Assignee: V. Mane Fils S.A. (FR)

( * ) Notice: Subject to any disclaimer, the term of this patent is extended or adjusted under 35 U.S.C. 154(b) by 769 days.

(21) Appl. No.: 10/640,280

(22) Filed: Aug. 13, 2003

(65) Prior Publication Data

US 2005/0123601 A1 Jun. 9, 2005

Related U.S. Application Data

(63) Continuation-in-part of application No. 10/467,925, filed as application No. PCT/FR02/04034 on Nov. 25, 2002.

(30) Foreign Application Priority Data

Nov. 26, 2001 (FR) .................. 01 15277

(51) Int. Cl.
*A61K 9/48* (2006.01)
(52) U.S. Cl. .............. 424/451; 424/452; 424/456; 424/458; 424/463; 424/464
(58) Field of Classification Search .............. None
See application file for complete search history.

(56) References Cited

U.S. PATENT DOCUMENTS

| 2,578,943 | A | 12/1951 | Palermo et al. |
|---|---|---|---|
| 4,935,243 | A | 6/1990 | Borkan et al. |
| 5,064,650 | A | 11/1991 | Lew |
| 5,164,195 | A | 11/1992 | Lew |
| 5,186,948 | A | 2/1993 | Takei |
| 5,188,822 | A | 2/1993 | Viccaro et al. |
| 5,223,185 | A | 6/1993 | Takei et al. |
| 5,273,706 | A | 12/1993 | Laughner |
| 5,286,496 | A | 2/1994 | Stapler et al. |
| 5,300,305 | A | 4/1994 | Stapler et al. |
| 5,364,634 | A | 11/1994 | Lew |
| 5,370,864 | A | 12/1994 | Peterson et al. |
| 5,382,424 | A | 1/1995 | Stapler et al. |
| 5,387,093 | A | 2/1995 | Takei |
| 5,472,712 | A | 12/1995 | Oshlack et al. |
| 5,595,758 | A | 1/1997 | Adusumilli et al. |
| 5,620,707 | A * | 4/1997 | Sanker et al. ............... 424/489 |
| 5,882,680 | A | 3/1999 | Suzuki et al. |
| 6,197,757 | B1 | 3/2001 | Perrier et al. |
| 6,200,603 | B1 | 3/2001 | Rowe et al. |
| 6,238,690 | B1 | 5/2001 | Kiefer et al. |
| 6,426,089 | B1 * | 7/2002 | Sunohara et al. ............. 424/451 |
| 2002/0096795 | A1 * | 7/2002 | Chandler .................... 264/4.1 |
| 2003/0017209 | A1 * | 1/2003 | Parikh et al. ................. 424/492 |
| 2004/0234590 | A1 * | 11/2004 | Mane et al. ................. 424/451 |

FOREIGN PATENT DOCUMENTS

| EP | 1 020 177 A1 | 7/2000 |
|---|---|---|
| EP | 1 240 883 A1 | 9/2002 |
| JP | 50106877 | 8/1975 |
| JP | 55138457 | 10/1980 |
| JP | 200109785 | 4/1990 |

* cited by examiner

*Primary Examiner*—Robert A Wax
*Assistant Examiner*—Hasan S Ahmed
(74) *Attorney, Agent, or Firm*—Barnes & Thornburg LLP

(57) ABSTRACT

The present invention relates to a capsule comprising a core and at least one envelope comprising at least one film-forming polymer, characterized in that it exhibits a total solubilization time for its envelope of less than or equal to 85 s, according to a test A, preferably less than or equal to 80 s, more preferably less than or equal to 70 s.

Figure 1:
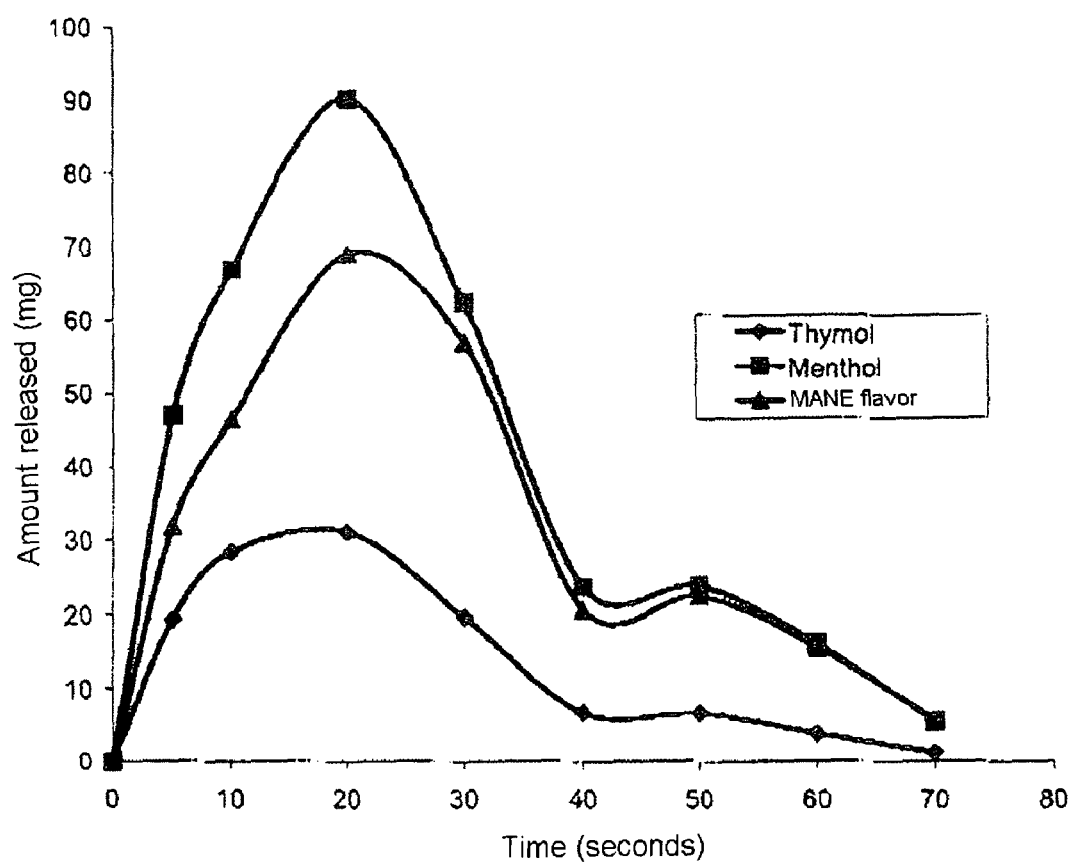

The invention also relates to the method of producing said capsule, and also to the products comprising said capsule, such as the food, pharmaceutical, oral hygiene or cosmetic products.

17 Claims, 1 Drawing Sheet

CAPSULE FOR RAPID SOLUBILIZATION AND RELEASE OF THE CONTENT

CROSS-REFERENCE TO RELATED APPLICATIONS

This application is a continuation-in-part of U.S. patent application Ser. No. 10/467,925, filed Aug. 13, 2003, which is a U.S. national phase application of PCT International Application No. PCT/FR02/04034, filed Nov. 25, 2002, which claims priority to French Patent Application No. 01/15277 filed Nov. 26, 2001.

TECHNICAL FIELD

The present invention relates to a capsule for rapid solubilization and release of the content.

BACKGROUND

In the fields in particular of food products and of oral care, the intention is to administer to an individual a compound such as an active principle or an aromatic product. Various methods of administration have been developed, depending on the applications: powders, granules, capsules, microcapsules, liposomes, microspheres, etc. These various means generally all exhibit characteristics relating to the protection and/or to the release of the compound administered, suitable for the finished product. They may in particular be physical (mechanical, temperature, etc.), chemical, (pH, water, ionic strength, etc.) or enzyme resistance, or properties of insolubility or of gradual solubility (compounds which must be swallowed, gastro-resistant compounds, etc.).

Interest will be focused more particularly here on capsules or microcapsules. Schematically, a capsule or microcapsule comprises a core containing the compound(s) to be vehicled (the content), and one or more envelopes, often based on gelatin. The difference between a capsule and a microcapsule is the size, which is more or less larger. In the present patent application, the term "capsule" will be used to denote capsules and microcapsules.

The capsules known in the prior art can exhibit certain problems of stability and leaktightness of the envelope, with in particular migration of core constituents to the outside or migration of envelope constituents to the inside. Other problems encountered relate to the incorporation of one or more of the components into the core or the envelope of the capsule, or further the method of production.

The capsules encountered are generally swallowed so as to release an active agent in the stomach for example, or, on the contrary, must be kept in the mouth for a certain amount of time in order to allow the active agent or the flavour to be released.

Mention is made herein of U.S. Pat. No. 5,300,305, which describes a microcapsule for oral hygiene comprising a core surrounded by an envelope which contains the active ingredients difficult to solubilize in the core. U.S. Pat. No. 5,370,864 describes a capsule for oral hygiene comprising a particular component in the core. U.S. Pat. No. 5,286,496 describes a microcapsule for oral hygiene in which the core and the envelope comprise active agents.

Certain patents refer to a capsule with several layers. Document EP 1 020 177 describes a soft capsule comprising a first capsule in a second capsule, the second capsule dissolving in the stomach. U.S. Pat. No. 6,200,603 describes a capsule comprising a core and an envelope provided with an additional coating, which stabilizes the capsule and prevents migration of certain compounds between the layers.

The problem of the rate at which a capsule breaks up has been studied. Specifically, for some applications, it is preferable for the capsule to break up rapidly, in order for the compound(s) transported to be rapidly available.

Mention is in particular made herein of U.S. Pat. No. 5,620,707, which describes small hard capsules suitable for flavoring a beverage, presented as dissolving rapidly in the beverage. Capsules produced according to this patent are mentioned hereinafter, by way of a comparative example.

However, in addition to the rate of breaking up, the solubilization of the capsule and more particularly of the envelope of the capsule should be taken into account. The question raised is therefore what becomes of the envelope once it has broken up and released its contents. In fact, in many cases, the capsule envelope is slowly or incompletely insolubilized due to the internal or external crosslinking of the gelatin which it comprises. This effect prevents or slows down the rapid release of the content of the capsule and may, in addition, cause an unpleasant feeling in the mouth due to the nonsolubilized envelope residues, which will be referred to here as the "skin effect".

Now, it is important, for certain applications, to be free of this skin effect, which causes an unpleasant feeling in the mouth.

U.S. Pat. No. 6,238,690 mentions this problem. In the description of the prior art of this patent, it is specified that capsules are conventionally formed using, for the envelope, film-forming materials of the gelatin type which have the drawback, besides the need to use a complex method of production, of dissolving slowly while leaving an unpleasant residue in the mouth. In this patent, the solution provided is to use, as envelope material, not a film-forming material, but a carbohydrate in the glass state.

However, the problem remains for capsules in which the envelope comprises a film-forming material.

SUMMARY OF THE INVENTION

After a great deal of research, the applicant has designed and developed a new capsule in which the envelope comprises a film-forming polymer, for rapid solubilization and release of the content. The capsule according to the invention is solubilized very rapidly and, in addition, exhibits no skin effect; the solubilization of the envelope is therefore optimal. The invention thus concerns a capsule comprising a core and at least one envelope comprising at least one film-forming polymer, characterized in that it exhibits a total solubilization time of its envelope of less than or equal to 85 s, according to a test A which is defined below.

In this test A, a dissolving device having a continuous flow cell as described in the French or American Pharmacopoeia (USP XXIII, 724) is used. This device makes it possible to model the solubility of the capsule in the oral cavity. Use is preferentially made of a continuous flow cell rather than a conventional dissolving device for a capsule, due to the fact that the content of the capsule may be completely lipophilic and therefore sometimes float at the surface and not always make it possible to obtain homogeneous samples over time.

The procedure used in the test A is as follows: a single capsule is introduced into the cell of a dissolving device as mentioned in the previous paragraph, which cell is crossed by an aqueous flow maintained at 37+/−0.5° C., pH 6.5, 50 ml/min. The capsule is then observed through the cell with the naked eye or using a camera combined with image analysis software (Microvision), making it possible to define a piercing time (opening of the envelope), a breaking up time (total release of its content) and a total solubilization time (disappearance of the envelope of the capsule). In the present patent application, the term "solubilization" is intended to mean the solubilization of the envelope of the capsule, also called disintegration within the meaning of the Pharmacopoeia.

The total solubilization time for the envelope of a capsule according to the invention is less than or equal to 85 s according to the test A, preferably less than or equal to 80 s, more preferably less than or equal to 70 s. The breaking up time of a capsule according to the invention is less than or equal to 30 s, preferably less than or equal to 20 seconds, more preferably less than or equal to 15 s.

Such a capsule, when it is ingested, therefore generates an immediate perception in the mouth of the active compounds which it contains.

A capsule according to the invention can be used as it is, as a finished product or a new pharmaceutical form, or else as an ingredient of another pharmaceutical form or of another product. It can be solubilized after ingestion by the user, or solubilized in a medium which will be ingested by the user.

A capsule according to the invention is not a soft capsule within the meaning of the state of the art; it is a capsule which feels hard, and which can break when it is pressed too hard between the fingers. Its hardness is of the order of 1 to 5 kg/cm$^2$.

DETAILED DESCRIPTION

In one embodiment, a capsule according to the invention is spherical or substantially spherical, preferably perfectly spherical. It is variable in diameter, preferably from 1 to 7 mm in diameter. This diameter will depend on the use, and may be easily chosen by the person skilled in the art. The weight of a capsule according to the invention is variable; it may be from 0.5 to 170 mg. In a preferred embodiment, the capsule according to the invention has a diameter of 4.5 to 6.5 mm and a weight of 45 to 140 mg; for example, a diameter of 4.5 to 5.5 mm and a weight of 45 to 80 mg.

A capsule according to the invention is made up of at least one fine envelope and a liquid core. It may be shiny, transparent or nontransparent in appearance. The core and the envelope may be colored, either the same color or different colors.

The envelope of the capsule according to the invention comprises at least one film-forming polymer chosen from the film-forming polymers used in the food or pharmaceutical field and known to the person skilled in the art, in particular gelatins, polyvinyl alcohols (PVAs), natural gums (gum arabic, guar gum, carob gum, gellan gum, pullulan gum, etc.), carreghenans, cellulose derivatives, starch derivatives, etc.

It also comprises at least one plasticizer, which may be of the glycerol, sorbitol, maltitol, triacetine or PEG type, or another polyol with plasticizing properties, and preferably at least one acid of the monoacid, diacid or triacid type, in particular citric acid, fumaric acid, malic acid, etc. The use of at least one such acid in particular makes it possible to provide microbiological stability of the envelope of the capsule and to adjust its physicochemical and sensory properties during dissolving thereof (pH, solubility, etc.).

The thickness of the envelope of the capsule according to the invention is between approximately 30 and approximately 100 μm, preferably from 50 to 65 μm. The envelope represents from 8 to 30% of the weight of the capsule, preferably 8 to 15%.

The core of the capsule according to the invention is preferentially composed of a mixture of molecules which are hydrophobic or partially soluble in ethanol, or of molecules formulated as an oil/water/oil emulsion. It may be composed of one or more lipophilic solvents conventionally used in the food, pharmaceutical or cosmetic industries. They may in particular be triglycerides, and in particular triglycerides of caprylic and capric acid, mixtures of triglycerides such as vegetable oil, olive oil, sunflower oil, corn oil, groundnut oil, grapeseed oil, wheatgerm oil, mineral oils and silicone oils. The amount of lipophilic solvent in the core of a capsule according to the invention is of the order of 0.01 to 90% of the weight of the capsule, preferentially 25 to 75%.

The core may also comprise one or more aromatic or fragrancing molecules as conventionally used in the formulation of flavoring or fragrancing compositions. Mention will in particular be made of aromatic, terpenic and/or sesquiterpenic hydrocarbons, and more particularly essential oils, alcohols, aldehydes, phenols, carboxylic acids in their various forms, aromatic acetals and ethers, nitrogenous heterocycles, ketones, sulfides, disulfides and mercaptans which may be aromatic or nonaromatic. It may also comprise one or more molecules or extracts for cosmetic use.

The core may also comprise one or more "weighting" agents as used in aromatic emulsions. Mention will be made of dammar gum, wood resins of the ester gum type, sucrose acetate isobutyrate (SAIB) or brominated vegetable oils. The function of these weighting agents is to adjust the density of the liquid core.

The core may also comprise one or more sweeteners, which may be provided in the form of a solution or suspension in ethanol. Mention will be made, nonexclusively, of aspartame, NHDC, sucralose, acesulfame, neotame, etc.

The core may also comprise one or more "sensate" aromatic agents, which provide either a freshening effect or a hot effect in the mouth. As freshening agent, mention will in particular be made of menthyl succinate and derivatives thereof, in particular Physcool® marketed by the applicant company. As an agent with a hot effect, mention will be made of vanillyl ethyl ether.

The exact composition of the core will of course depend on the use envisaged for the capsule: food, oral hygiene, pharmaceutical, cosmetic, and therefore of the active compound(s) that it is desired to administer to an individual, and may be easily determined by the person skilled in the art.

The core of a capsule according to the invention represents by weight 70 to 92% of the capsule, preferably 80 to 92%, more preferably 85 to 92%.

Several methods of producing capsules are known. Mention will be made of the interfacial polymerization or coacervation techniques which make it possible to obtain capsules which are generally small in size, generally less than 1 mm, for a perfectly spherical shape, capsules with a larger granulometry exhibiting irregularities in sphericity. Mention may also be made of the method of producing soft capsules which makes it possible to obtain capsules several millimeters in diameter, obtained by welding two hemispherical envelopes.

The capsules according to the invention may be prepared by co-extrusion. The method of co-extrusion consists in co-extruding two liquids, one external and hydrophilic (which will become the envelope), the other central and lipophilic (which will become the core), in an oily organic medium, which leads to the formation of spherical capsules with no welding joint. Systems such as disclosed in EP 1240883 or in Freund's U.S. Pat. No. 5,186,948, U.S. Pat. No. 5,223,185, U.S. Pat. No. 5,387,093 and U.S. Pat. No. 5,882,680 illustratively can be used.

Conventionally, the capsules, after co-extrusion, are kept cold to ensure correct gelling of the envelope, and are then centrifuged in order to remove the surplus oil, then dried and washed with organic solvent (acetone, ethyl acetate, petroleum ether, etc.) also to remove the surplus oil. In the case of soft capsules, the capsules are treated by immersion in an organic liquid or an emulsion containing a crosslinking agent of the aldehyde type (formaldehyde, glutaraldehyde, etc.) which makes it possible to obtain a suitable hardness of the capsules, then dried with a stream of air at 25% humidity (see U.S. Pat. No. 2,578,943). Such a method with drying using dry air or a vacuum leads, however, to insolubilization of the gelatin envelope via crosslinking reaction.

The capsules according to the invention can be obtained using the following method:
- co-extrusion of the components of the envelope and of the components of the core,
- optionally centrifugation,
- optionally immersion of the capsules obtained in a bath of ethanol or of anhydrous organic solvent,
- drying.

More precisely, after formation by co-extrusion, and optionally after centrifugation, the capsules are optionally immersed in a bath of ethanol or of any other anhydrous organic solvent, such as ethyl acetate or isopropanol, maintained at a temperature of between 0 and 25° C., more particularly between 10 and 20° C., making it possible to wash the oil remaining at the surface from the capsules, and then to gradually dehydrate the gelatin film, according to an osmotic equilibrium. One, two or more baths in an anydrous organic solvent for washing and partial drying of the capsule may be used. Thus, the problems of crosslinking and of insolubilization of the envelope, and therefore the skin effect, are avoided.

When leaving the washing bath, the capsules are dried in a current of air with controlled temperature and humidity characteristics. The relative humidity of the drying air is between 20 and 60%, preferentially between 30 and 50%. The temperature of the drying air is between 15 and 60° C., preferentially between 35 and 45° C.

In addition, this method makes it possible to obtain capsules which are perfectly spherical and very homogeneous in size.

EXAMPLES

Example 1

Capsule for Oral Application of the "Breathfreshener" Type

A capsule 4 mm in diameter and weighing 38 mg, the composition of which is given in Table 1, is analyzed according to test A. Various capsules obtained on the market (soft capsule or other), of similar size, and for identical application, are also tested according to test A, as comparisons.

The results are given in Table 2. The comparison of the total solubilization time and of the breaking up times (in seconds) according to test A demonstrate the rapidity of solubilization of the capsule according to the invention.

These results are confirmed by a panel of tasters, who observe the properties of more rapid solubilization and with no residue, of the capsule according to the invention.

TABLE 1

| Gelatin | 7.7% |
|---|---|
| Sorbitol | 1.2% |
| Fumaric acid | 0.18% |
| Blue FD&C #1 (marketed by WARNER JENKINSON) | 0.0001% |

TABLE 1-continued

| Miglyol 812S (marketed by HULS) | 62.92% |
|---|---|
| Flavor | 23.6% |
| Physcool ® (freshening agent marketed by the applicant) | 4.4% |

TABLE 2

| | Breaking up time of the envelope | Disintegration or solubilization time for the envelope |
|---|---|---|
| Capsule according to the invention | 12 s | 66 s |
| Capsule 1 - 5 mm spherical co-extrusion capsule (Company Freund Ltd) | 86 s | 248 s |
| Capsule 2 - 3.2 mm spherical co-extrusion capsule (Company Jintan, under the trademark Crystal Dew) | 34 s | 87 s |
| Capsule 3 - 9 × 6 mm soft capsule of the ovoid type (Breathcaps from Breath Asure Inc.) | 75 s | 302 s |
| Capsule 4 - 7.5 × 5.5 mm soft capsule of the ovoid type (Japan-Citrus) | 105 s | 333 s |

Example 2

Cinnamon-Flavored Capsule

Two types of capsule according to the invention, 5 mm in diameter, the compositions 1 and 2 of which are given in Table 3, are analyzed according to test A. By way of comparative example, a 5 mm capsule, produced according to Example 2 of U.S. Pat. No. 5,620,707, is also tested according to test A.

TABLE 3

| | Composition 1 (%) | Composition 2 (%) | Capsule according to U.S. Pat. No. 5,620,707 (%) |
|---|---|---|---|
| Gelatin | 8.804 | 7.528 | 11.484 |
| Sorbitol (70% sol) | 0.978 | 0.836 | 4.362 |
| Fumaric acid | 0.196 | 0.167 | |
| Saccharine | | | 0.500 |
| Acesulfame | | | 0.644 |
| Aspartyl phenyl alanine methyl ester | | | 0.345 |
| Glycyrrhizin | | | 0.030 |
| Propylene glycol | | | 2.435 |
| Polyethylene 400 | | | 25.820 |
| Allura Red (red 40) | 0.022 | 0.019 | 0.003 |
| Water | 0.500 | 0.450 | 1.672 |
| Captex 300 (liponate) | 61.280 | 72.145 | 10.206 |
| Cinnamon flavor | 22.500 | 11.029 | 15.250 |
| Isopropanol | | 7.280 | |
| Ethanol | 5.000 | | |
| Sucralose | 0.720 | 0.546 | |
| Sucrose acetate isobutyrate (SAIB) | | | 27.249 |

The results of the analyses of these capsules, according to test A, and also in the sensory analysis, are as follows:

TABLE 4

|  | Composition 1 | Composition 2 | Capsule according to U.S. Pat. No. 5,620,707 |
|---|---|---|---|
| Breaking up time | 12 +/− 3 s | 17 +/− 2 s | 48 +/− 3 s |
| Total solubilization time | 65 +/− 4 s | 70 +/− 2 s | 108 +/− 9 s |
| Total solubilization time after placing in the mouth, by sensory evaluation | 40 s | 35 s | >2 min |

Example 3

Capsule for Controlled Release of Aromatic Molecules

A 5 mm capsule, the composition of which is given in Table 5, is analyzed according to test A.

TABLE 5

|  | % | mg |
|---|---|---|
| Gelatin | 6.63 | 4.105 |
| Sorbitol | 1.78 | 1.103 |
| Fumaric acid | 0.14 | 0.088 |
| Miglyol 812S | 72.98 | 45.21 |
| Thymol | 2.58 | 1.60 |
| Menthol | 6.28 | 3.89 |
| Flavor marketed by the applicant | 7.35 | 4.56 |
| Physcool ® | 2.26 | 1.40 |
| TOTAL | 100 | 61.95 |

The taking of various samples makes it possible to establish the in vitro kinetics of release of aromatic molecules in water at 37° C.+/−1° C. and at pH 6.5. Table 6 indicates the concentration of aromatic molecules of various samples. A rapidity of release of the order of a few seconds is thus demonstrated.

TABLE 6

| Time (seconds) | Thymol | Menthol | MANE flavor |
|---|---|---|---|
| 0-5 | 19 | 47 | 32 |
| 5-10 | 28 | 67 | 46 |
| 10-15 | 22 | 63 | 50 |
| 15-20 | 31 | 90 | 69 |
| 20-30 | 20 | 62 | 57 |
| 30-40 | 7 | 24 | 21 |
| 40-50 | 7 | 24 | 23 |
| 50-60 | 4 | 16 | 16 |
| 60-70 | 1 | 6 | 5 |
| Total | 139 ppm | 399 ppm | 319 ppm |

The curves of release of each aromatic molecule (in mg) as a function of time (in seconds) are given in FIG. 1. It may be noted that most of the molecules are released within 40 s, at most within 70 s.

Example 4

Capsule as Core of a Confectionery Product

A 4 mm capsule weighing 38 mg, the composition of which is given in Table 7, is used as a core provided with a sugar coating so as to obtain a confectionery product for oral hygiene.

TABLE 7

| Gelatin | 10% |
|---|---|
| Sorbitol | 1.2% |
| Fumaric acid | 0.2% |
| Blue FD&C #1 | 0.001% |
| Miglyol 812S | 66.099% |
| Flavor and active agents | 20% |
| Physcool ® | 2% |
| Vitamin E | 0.5% |

The capsule according to the invention is rapidly solubilized in the mouth after dissolving of the coating envelope. The coating envelope is obtained by sugar coating, in a sugar-coating pan, of the capsule using the following raw materials: maltitol, gum arabic, shellac gum, vegetable oil, titanium dioxide, menthol MSD powdered flavor marketed by the applicant. It is observed that the capsule does not leave any skin effect at the end of tasting and leaves a strong flavouring impact in the mouth.

Example 5

Capsule for Drink Application

A 1 mm capsule weighing 0.53 mg, according to the invention, a composition of which is given in Table 8, is incorporated into a powdered instant coffee.

TABLE 8

| Gelatin | 15% |
|---|---|
| Gum arabic | 9.89% |
| Sorbitol | 3% |
| Fumaric acid | 0.01% |
| Caramel dye | 0.1% |
| Vegetable oil | 36% |
| Volatile coffee flavor marketed by the applicant company | 36% |

100 ml of hot water at 65° C. are poured. After 10 seconds, the capsule solubilizes and releases a strong pleasant smell of coffee. The envelope of the capsule is completely solubilized after 30 seconds.

Example 6

Capsule for Savory Application

A 4 mm capsule weighing 38 mg, according to the invention, the composition of which is given in Table 9, is incorporated, at 0.5%, into a powdered mixture for instant soup.

TABLE 9

| | |
|---|---|
| Gelatin | 7% |
| Gum arabic | 4% |
| Sorbitol | 1.5% |
| Citric acid | 0.5% |
| Sunflower oil | 60% |
| Chicken flavor marketed by the applicant company | 27% |

200 ml of hot water at 65° C. are poured. After 10 seconds, the capsule solubilizes and releases a strong pleasant smell of chicken. The envelope of the capsule is completely solubilized after 30 seconds.

The invention claimed is:

1. A hard capsule comprising
a core comprising one or more core components, said core representing 70 to 92% by weight of the capsule, and
a water-soluble envelope comprising 6.5 to 15% by weight of the capsule of a film-forming polymer of gelatin, 0.8 to 1.5% by weight of the capsule sorbitol as a plasticizer, and 0.01 to 0.2% by weight of the capsule fumaric acid, wherein said envelope represents from 8 to 30% of the weight of the capsule and contains the core therein,
wherein the capsule has a hardness of 1 to 5 Kg/cm² and the envelope of the capsule exhibits a total solubilization time of less than or equal to 85 seconds, using a dissolving device wherein the capsule is crossed by an aqueous flow maintained at 37+/−0.5° C., pH 6.5, 50 ml/min.

2. The capsule of claim 1 wherein the capsule is formed by co-extrusion of the core components and envelope components, followed by immersion in a bath of an anhydrous organic solvent, followed by drying, without immersion in an organic liquid or emulsions that contains a crosslinking agent.

3. The capsule of claim 1 wherein the capsule exhibits a total solubilization time of its envelope of less than or equal to 70 seconds, using a dissolving device wherein the capsule is crossed by an aqueous flow maintained at 37+/−0.5° C., pH 6.5, 50 ml/min.

4. A hard capsule comprising
a core comprising one or more core components, said core representing 70 to 92% by weight of the capsule, and
a water-soluble envelope comprising 6.5 to 15% by weight of the capsule of a film-forming polymer of gelatin, 0.8 to 1.5% by weight of the capsule sorbitol, as a plasticizer, and 0.5% by weight of the capsule citric acid, wherein said envelope represents from 8 to 30% of the weight of the capsule and contains the core therein,
wherein the capsule has a hardness of 1 to 5 Kg/cm² and the envelope of the capsule exhibits a total solubilization time of less than or equal to 85 seconds, using a dissolving device wherein the capsule is crossed by an aqueous flow maintained at 37+/−0.5° C., pH 6.5, 50 ml/min.

5. The capsule of claim 1 wherein the film-forming polymer further comprises gum arabic.

6. The capsule of claim 5 wherein the gum arabic represents by weight about 4 to 10% of the capsule.

7. The capsule of claim 1 wherein the core is 80 to 92% by weight of the capsule.

8. The capsule of claim 2 wherein the capsule is centrifuged subsequent to co-extrusion and prior to immersion.

9. The capsule of claim 2 wherein the anhydrous organic solvent is ethanol.

10. The capsule of claim 9 wherein the ethanol is between 10 and 20° C. and the capsule remains in the bath during gradual dehydration of the envelope.

11. The capsule of claim 1 wherein the envelope has a thickness between approximately 50 and approximately 65 μm and the envelope represents from 8 to 15% of the weight of the capsule.

12. The capsule of claim 4 wherein the envelope has a thickness is from 50 to 65 μm and the envelope represents from 8 to 15% of the weight of the capsule.

13. A hard capsule comprising
a core comprising one or more core components, and
a water-soluble ingestible envelope disposed about the core, the envelope made from envelope components, the envelope components consisting essentially of 6.5 to 15% by weight of the capsule of gelatin, and 0.8 to 1.5% by weight of the capsule sorbitol and either 0.01 to 0.2% by weight of the capsule fumaric acid or 0.5% by weight of the capsule citric acid,
wherein the capsule has a hardness of 1 to 5 Kg/cm² and the envelope of the capsule exhibits a total solubilization time of less than or equal to 85 seconds, using a dissolving device wherein the capsule is crossed by an aqueous flow maintained at 37+/−0.5° C., pH 6.5, 50 ml/min.

14. The capsule of claim 13 wherein the capsule is configured for oral application, the ratio of gelatin to sorbitol is from about 6.4:1 to about 9.0:1, and the ratio of gelatin to fumaric acid is from 42.8:1 to about 50:1.

15. The capsule according to claim 1, wherein, by weight of the capsule:
the amount of gelatin is about 8.8%, the amount of sorbitol is about 1.0% and the amount of fumaric acid is about 0.2%; or
the amount of gelatin is about 7.5%, the amount of sorbitol is about 0.8% and the amount of fumaric acid is about 0.17%; or
the amount of gelatin is about 6.6%, the amount of sorbitol is about 1.8% and the amount of fumaric acid is about 0.14%; or
the amount of gelatin is about 15%, the amount of sorbitol is about 3% and the amount of fumaric acid is about 0.01%; or
the amount of gelatin is about 7.7%, the amount of sorbitol is about 1.2% and the amount of fumaric acid is about 0.18%.

16. The capsule according to claim 4, wherein, by weight of the capsule, the amount of gelatin is about 7%, the amount of sorbitol is about 1.5% and the amount of citric acid is about 0.5%.

17. The capsule of claim 13 wherein the core is 85 to 92% by weight of the capsule.

* * * * *